United States Patent [19]

Naimpally et al.

[11] 4,207,590
[45] Jun. 10, 1980

[54] COMBINED PHASE SHIFT FILTER NETWORK IN A COLOR VIDEO SIGNAL PROCESSING SYSTEM EMPLOYING DYNAMIC FLESH TONE CONTROL

[75] Inventors: Saiprasad V. Naimpally; Thomas D. Yost, both of Indianapolis, Ind.

[73] Assignee: RCA Corporation, New York, N.Y.

[21] Appl. No.: 20,337

[22] Filed: Mar. 14, 1979

[51] Int. Cl.² .......................................... H04N 9/535
[52] U.S. Cl. ................................................... 358/28
[58] Field of Search ...................................... 358/28

[56] References Cited
U.S. PATENT DOCUMENTS

| 3,749,825 | 7/1973 | Moore | 358/28 |
| 4,048,652 | 9/1977 | Rzeszewski | 358/28 |

*Primary Examiner*—Richard Murray
*Attorney, Agent, or Firm*—Eugene M. Whitacre; William H. Meagher; Ronald H. Kurdyla

[57] ABSTRACT

A combined phase shift and bandpass filter circuit in a color television receiver including color signal demodulators, and an automatic flesh tone correction network which provides a reference signal for the color demodulators, is disclosed. The circuit comprises an integral bandpass filter and phase shift network coupled between the output of the flesh tone correction network and the reference signal inputs of the demodulators. The circuit filters unwanted frequency components of the reference signal from the flesh correction network, and provides phase shifting of the reference signal as appropriate for proper operation of the demodulators. The circuit exhibits good phase stability, does not require alignment from receiver to receiver, and requires a minimum of connecting terminals to the flesh correction network and color demodulators.

8 Claims, 4 Drawing Figures

COMBINED PHASE SHIFT FILTER NETWORK IN A COLOR VIDEO SIGNAL PROCESSING SYSTEM EMPLOYING DYNAMIC FLESH TONE CONTROL

This invention concerns an electrical circuit employed in a color television receiver or similar system including a hue correction network for automatically correcting errors in reproduction of flesh tones. The circuit filters an output reference signal from the correction network, and also imparts a required amount of phase shift to the reference signal prior to the application thereof to color signal demodulators in the receiver.

It is known that, in the process of reproducing images from received color television signals, for example, the phase relationship between the transmitted color reference carrier and the color image-representative (chrominance) signals may vary due to a variety of factors such as atmospheric conditions and switching channels at the receiver. The variations cause errors in the hue of a reproduced color image, and are particularly noticeable by a viewer when the color image includes flesh tones (i.e., tones represented by signals in the orange or "+I" phase region).

A number of systems have been utilized to provide automatic flesh tone correction in color television receivers. One such system is described in U.S. Pat. No. 3,996,608 of L. A. Harwood. In that system, a dynamic flesh control network provides a continuous wave output reference signal having a phase modified towards the phase of chrominance signals sensed as having a phase within a nominal range of flesh tone phase. The reference signal is afterwards phase shifted to provide mutually quadrature phase reference signals, which are applied to "I" and "Q" phase demodulators in the receiver for deriving R-Y, G-Y and B-Y color difference signals in a known manner.

In dynamic control systems of this type, the reference signal from the flesh control network often contains unwanted signal components such as harmonics of the 3.58 MHz chrominance subcarrier frequency, and a D.C. component which varies at a relatively low frequency rate. In order to compensate for or cancel these unwanted components, a parallel tuned inductance-capacitance (LC) filter circuit (sometimes referred to as a "flesh tank" or a sine wave restoration circuit) is included for filtering the reference signal developed by the flesh control network. The operating characteristics of such a filter is sensitive to component tolerances, and typically includes a relatively large and costly adjustable reactive element (e.g., a variable inductor) to permit alignment from receiver to receiver.

When the flesh control network is fabricated in an integrated circuit, the filter circuit, comprising relatively large discrete components, is located external to the integrated circuit and is connected to the integrated circuitry via an external terminal of the integrated circuit. This connection introduces an unwanted capacitance and attendant phase shift which must be compensated for.

Thus in accordance with the principles of the present invention, it is recognized that, with a dynamic flesh control system of the type described, it is desirable to provide a single, fixed alignment network coupled between the output of the flesh control network and the inputs to the color demodulators for filtering the unwanted signal components mentioned previously, for providing appropriate phase shifting including mutually quadrature phased input reference signals to the "I" and "Q" color demodulators. Moreover, such a network desirably should exhibit good phase stability with respect to normally expected component tolerance variations and frequency deviations of the reference signal.

In accordance with the invention, a composite filter is included in a color television signal processing system comprising a demodulator supplied with chrominance signals to be demodulated, and a phase control network for providing a phase controlled reference signal with a phase modified towards the phase of chrominance signals sensed as having a phase within a nominal range of flesh tone phase. The composite filter is coupled between the output of the phase control network and a reference signal input of the demodulator, and includes first and second filter networks. The second filter network is coupled to the output of the first filter and exhibits a peak amplitude response at a frequency greater than the frequency of the controlled reference signal. The first and second filter networks each impart a given phase shift to the controlled reference signal so that this signal, when applied to the demodulator reference input, exhibits timing synchronism with the chrominance signals appropriate for proper operation of the demodulator. The composite filter exhibits an amplitude versus frequency response in the region of the controlled reference signal frequency such that amplitude and phase variations of the controlled reference signal are small with expected changes in the frequency of the controlled reference signal.

Figure 1:
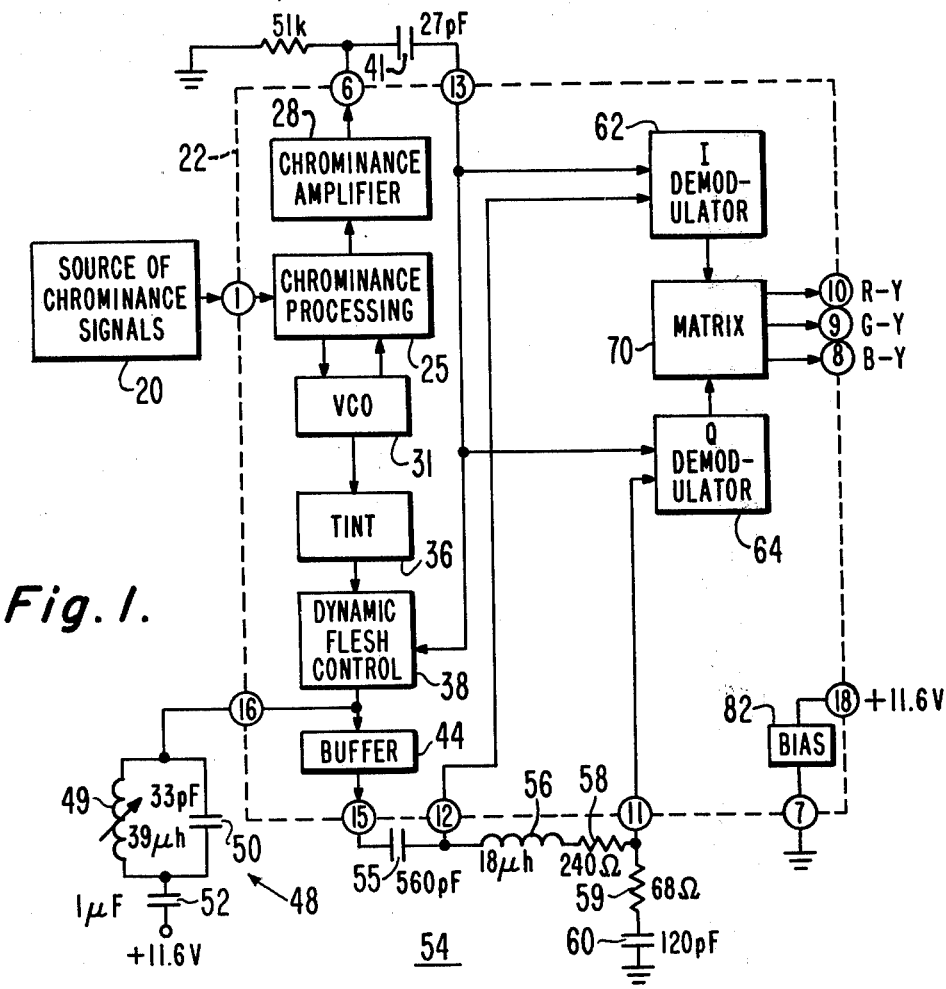
FIG. 1 illustrates partly in block diagram form and partly in schematic diagram form a portion of a color television receiver including an automatic flesh tone correction circuit.

In FIG. 1, a source of chrominance signals 20 derived from a received color television signal supplies chrominance signals to an input terminal 1 of an integrated circuit 22, which in this example corresponds to the CA3151 chrominance signal processing integrated circuit, additional details of which can be obtained from RCA Corporation Solid State Division, Somerville, New Jersey. The chrominance signals are further processed in a chrominance processing unit 25, which in this example includes amplification stages, sampling networks, automatic color control (ACC) and automatic frequency and phase control (AFPC) detectors, and associated circuits.

Output signals from processor 25 are supplied to a voltage controlled color reference oscillator (VCO) 31 (e.g., of the type described in U.S. Pat. No. 4,020,500), which is arranged to regenerate a continuous wave output reference signal from the burst reference component which is customarily provided in a broadcast color television signal. An output signal of VCO 31 is supplied as an input to sampling and detecting circuits within unit 25, which monitor the phase and frequency of the oscillator signal and provide appropriate control signals for locking the oscillator signal in phase and frequency to the burst component.

Another output of VCO 31 is applied to a hue (tint) control unit 36 (e.g., of the type shown in U.S. Pat. No. 4,051,512) which may be adjusted either electronically or manually, for example, by means of a potentiometer to shift the phase of the oscillator reference signal and thereby produce a change in hue of a reproduced image. A reference signal output of tint control unit 36 is coupled to one input of a dynamic flesh control unit 38, another input of which is supplied with amplified chrominance signals which are coupled from an output of a chrominance amplifier 28 via a terminal 6, an A.C. coupling capacitor 41, and a terminal 13.

Figure 3:
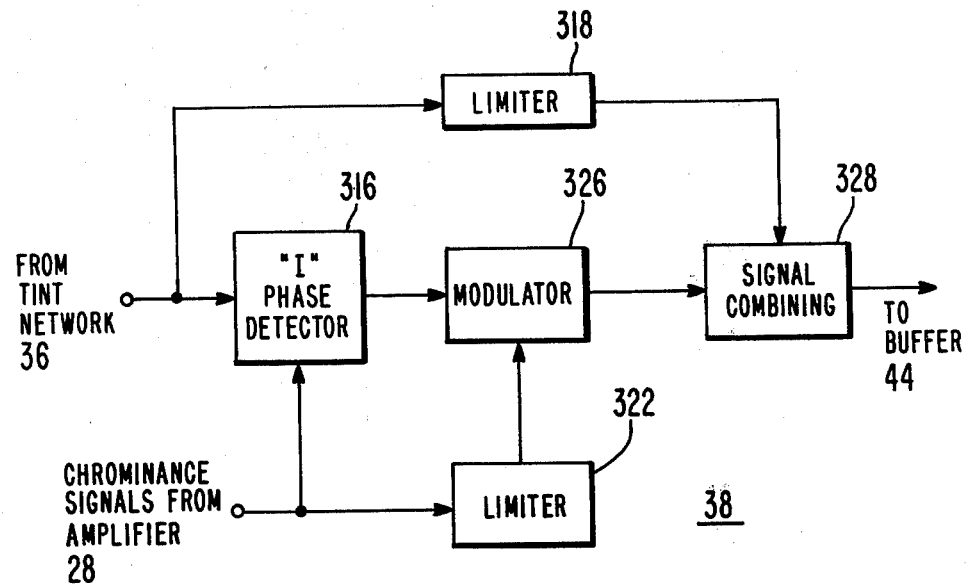
FIG. 3 shows a block diagram of an automatic flesh tone control network shown in the arrangements of FIGS. 1 and 2.

The essential elements of flesh control unit 38 are shown in FIG. 3. In FIG. 3, chrominance signals from amplifier 28 are supplied to one input of an I axis phase detector 316, and to a chrominance signal limiting amplifier 322. Another input of phase detector 316 is supplied with reference carrier output signals from tint network 36. The limited chrominance signal output of limiter 322 is supplied to one input of a signal modulator 326. The output of phase detector 316, which is the product of the applied chrominance and reference carrier signals, is applied to a second input of modulator 326 to vary the amplitude of the amplitude limited chrominance signal which is applied to an input of a signal combining network 328. An amplitude limited carrier reference signal from an output of a signal limiter 318 is coupled to an input of combining network 328, where it is vectorially combined with selected portions of the amplitude limited chrominance signal from modulator 326. A resultant phase corrected carrier reference signal from the output of combining network 328 is coupled to a buffer 44 (FIG. 1).

Flesh correction network 38 operates on the premise that the operating parameters of tint control network 36 (FIG. 1) are adjusted (e.g., by means of a viewer adjustable potentiometer, not shown) at some point in time to reasonably produce flesh tones. Phase detector 316, which is arranged to detect characteristics of the chrominance signal along the same phase axis as that along which "I" demodulator 62 operates, will then be aligned to detect the presence of flesh tone chrominance signals. In that case, detector 316 multiplies the applied chrominance and subcarrier signals to provide a maximum output when the applied chrominance signal phase is coincident with the I phase axis, and a decreasing output is provided as the chrominance signal phase departs from the I axis. Thus, when the chrominance signals are in the vicinity of flesh tones, phase detector 316 controls the transfer characteristic of modulator 326 to pass more or less of the amplitude limited chrominance signal output of limiter 322 according to the phase displacement between the I reference phase carrier and the chrominance signals. The resulting controlled portion of the amplitude limited chrominance signal combines with the limited reference subcarrier signal in combining network 328 to produce a new reference carrier, the phase of which is shifted towards that of the chrominance signal. Additional details concerning the operation of flesh correction circuit 38 are disclosed in U.S. Pat. No. 3,996,608 of L. A. Harwood.

Continuing with FIG. 1, the output reference signal from flesh correction circuit 38 is coupled at a low impedance via buffer 44 (e.g., an emitter follower transistor stage). The reference signal is afterwards phase shifted a predetermined amount by a network 54 coupled to external terminals 11, 12 and 15 before being applied as a reference input signal to "I" demodulator 62 and "Q" demodulator 64, which also receive input chrominance signals to be demodulated from amplifier 28 via terminal 13.

Demodulated chrominance signals from the respective outputs of demodulators 62, 64 are supplied to a matrix unit 70, where the demodulator signals are combined to provide R-Y, G-Y and B-Y color difference signals. The color difference signals are afterwards further processed and combined with the luminance component of the television signal to produce R, G, and B color image representative signals which are supplied to a color kinescope of the receiver (not shown). Operating bias voltage for the various circuits within integrated circuit 22 are provided from a bias supply 82 coupled between a terminal 18 to which a source of D.C. operating voltage (+11.6 volts) is applied, and a terminal 7 coupled to ground.

It is noted that the reference signal output from flesh correction unit 38 manifests a phase delay relative to the chrominance signal applied to demodulators 62 and 64. This phase delay (e.g., of the order of fifteen degrees) is attributable to signal processing delays such as may be caused by parasitic capacitance within unit 38, and is compensated for by means of a phase shift circuit 54.

Phase shift network 54 comprises discrete circuit elements and includes a high pass filter capacitor 55, an inductor 56, resistors 58 and 59, and a capacitor 60, coupled to terminals 11, 12 and 15 as shown. Capacitor 55 imparts a phase advance of approximately fifteen degrees to the reference signal from flesh control unit 38 to compensate for the phase delay mentioned above, so that proper timing synchronism between the chrominance signals and the reference signals as applied to "I" demodulator 62 is preserved. Capacitor 55 also serves as an A.C. coupling capacitor.

Output signals from network 54 appear at terminals 11 and 12 as phase shifted versions of the reference signal from terminal 15. The reference signal appearing at terminals 11 and 12 are substantially equal in amplitude and are in mutual quadrature phase relationship as appropriate for application to "I" and "Q" demodulators 62 and 64. In this example, the phase of the reference signal developed at terminal 12 leads the phase of the reference signal at terminal 15 by approximately fifteen degrees, and the phase of the reference signal developed at terminal 11 lags the phase of the reference signal at terminal 15 by approximately seventy-five degrees.

Also coupled to the output of flesh control unit 38 via an external terminal 16 is a discrete bandpass filter 48 which is tuned to the 3.58 MHz subcarrier frequency and exhibits a "Q" (figure of merit) of approximately 2. Filter 48 comprises a parallel resonant tuned circuit including an adjustable inductor 49 and a capacitor 50, arranged in series with a capacitor 52 between terminal 16 and a source of direct operating voltage (+11.6 volts). Filter 48 serves to remove unwanted switching frequency components attributable to the control action of unit 38 and harmonics of the 3.58 MHz subcarrier frequency from the reference signal provided from unit 38, and also restores this reference signal to a sinusoidal form by removing pulse components attributable to the switching control action of flesh control unit 38. Filter 48 also removes relatively low frequency (e.g., 500 KHz and less) variations in the D.C. level of the reference signal from unit 38. These level variations are essentially luminance information variations which typically are associated with chrominance signal phase (i.e., color) variations. In addition, filter 48 is arranged to compensate for the effects of an unwanted phase shift attributable to parasitic capacitances which may vary from receiver to receiver and which are associated with terminal 16 and a printed circuit board upon which integrated circuit 22 and filter 48 are mounted, for example.

The elimination of the unwanted frequency components, low frequency level variations and parasitic phase shift mentioned above serves to ensure that the desired amplitude and phase characteristics of the reference signal from unit 38 is unimpaired. Variable inductor 49 of filter 48 permits the operating characteristics of filter 48 to be aligned from receiver to receiver so that the factors mentioned above can be compensated for in all cases, and so that the operation of filter 48 can be adjusted to compensate for the effects of component tolerance variations.

Figure 2:
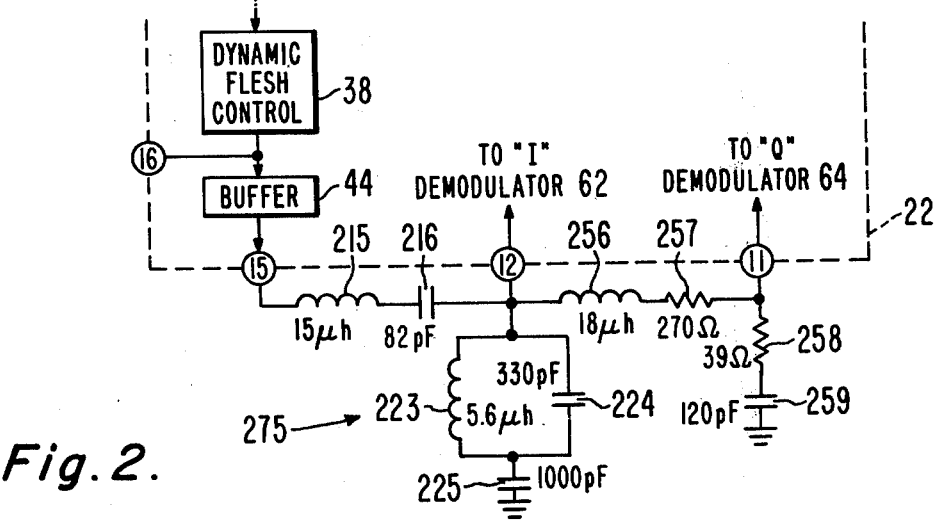
FIG. 2 depicts a portion of the arrangement of FIG. 1 including a circuit in accordance with the present invention.

Referring now to FIG. 2, a portion of the arrangement of FIG. 1 is shown as modified in accordance with the present invention. The adjustable bandpass filter 48 shown connected to terminal 16 in FIG. 1 has been eliminated in the arrangement of FIG. 2, and a composite bandpass filter and phase shift network 275 coupled to external terminals 11, 12 and 15 performs the bandpass filtering and phase shifting functions performed by networks 48 and 54 in FIG. 1, without needing alignment from receiver to receiver and requiring one less connecting terminal to integrated circuit 22.

Composite filter 275 comprises an integral combination of three bandpass filter networks.

A first filter network includes a series inductor 215 and capacitor 216 coupled between terminals 15 and 12. This network is arranged as a bandpass filter network which contributes to attenuating harmonic frequencies of the 3.58 MHz frequency of the reference signal from unit 38. Capacitor 216 also provides A.C. coupling of signals from terminal 15 to terminal 12. This filter network also contributes to the production of a compensating signal phase advance as will be discussed subsequently.

A second filter network of composite filter 275 is coupled between terminal 12 and ground and includes a parallel inductor 223 and capacitor 224 arranged in series with a capacitor 225. This network also contributes to attenuating harmonic frequencies of the reference signal, and imparts a phase advance to reference signals developed at terminal 12 relative to terminal 15. The phase advance imparted by the second filter network combined with the phase advance imparted to the reference signals by the first filter 215, 216 produces a total signal phase advance such that reference signals appearing at terminal 12 are advanced in phase approximately forty-eight degrees relative to terminal 15, substantially without amplitude attenuation at the frequency of the reference signal. This cumulative phase advance includes a fifteen degree phase advance component which serves to compensate for the fifteen degree phase delay attributable to signal processing delays within unit 38 as discussed in connection with FIG. 1, and a thirty-three degree phase advance component. The latter phase advance serves to compensate for the phase retardation which exists at terminal 16 when filter 48 (FIG. 1) is removed from terminal 16.

The cumulative phase advance provided by the first and second filters insures that the reference signal arrives at the inputs of demodulators 62 and 64 in proper timing synchronism with the chrominance signal input to the demodulators, so that the chrominance signal will be demodulated correctly. It is noted that the additional thirty-three degree phase advance is not required in a system which does not otherwise manifest the phase retardation associated with terminal 16 in this example.

The hue of demodulated flesh tones can be modified in accordance with the requirements of a particular system. For example, a flesh tone with a slight red tint can be produced by advancing the phase of the reference signal from unit 38 by an appropriate amount towards the red signal phase. This additional phase advance can also be provided by the first and second filter networks of composite filter 275.

A third bandpass filter coupled to terminals 11 and 12 includes a series inductor 256 and resistor 257, and a series resistor 258 and capacitor 259, arranged as shown. This network phase shifts the reference signal appearing at terminal 12 approximately ninety degrees substantially without amplitude attenuation at the reference signal frequency, such that reference signals developed at terminals 11 and 12 are in mutually quadrature phase relationship, as appropriate for application to demodulators 62 and 64. The third filter network also provides some attenuation of harmonic frequencies of the reference signal. However, any harmonic components appearing at terminals 11 and 12 are negligible since the harmonic frequencies are greatly attenuated by the coaction of the preceding first and second filter networks.

In addition to attenuating the harmonic frequencies, composite filter 275 also significantly attenuates unwanted, relatively lower frequency components of the order of 500 KHz and less, as well as other unwanted signal components of the reference signal from unit 38, as mentioned in connection with FIG. 1. These signal attenuation characteristics as well as other response characteristics of composite filter 275 can be seen from the signal response curves shown in FIG. 4.

Figure 4:
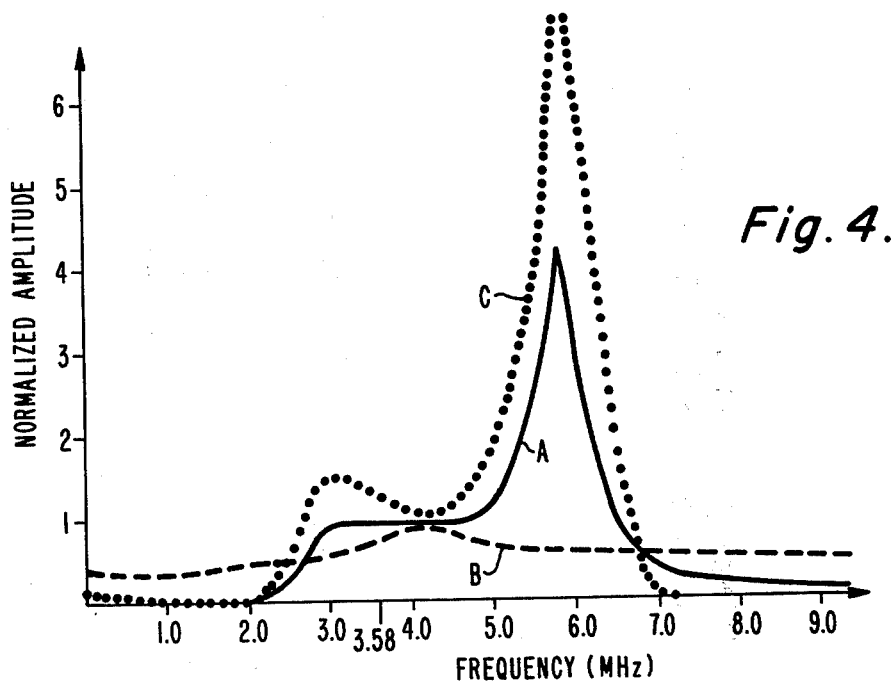
FIG. 4 illustrates an amplitude versus frequency response of the circuit shown in FIG. 2.

FIG. 4 illustrates amplitude versus frequency response curves A, B and C. Response curve A corresponds to the overall response of composite filter 275 in FIG. 2, which is relatively flat in the 3 MHz to 5 MHz range. Response curve B corresponds to the composite response of the first and third filter networks exclusive of the second filter network 223–225. The contribution of the second filter network to the composite response A is indicated by response curve C.

The composite response A of filter 275 essentially represents the product of responses B and C, which peak at different frequencies and exhibit different amplitude characteristics. In particular, it is noted that response curve B exhibits a peak amplitude response at a frequency other than the frequency of the reference signal, or slightly above four megahertz in this instance. This peak response is produced by the coaction of the first filter network, which is tuned to exhibit a peak amplitude response at approximately 4.5 MHz, with the third filter network, which is tuned to exhibit a peak amplitude response at approximately 3.4 MHz (the actual peaking frequencies are not critical). Also, response C, and therefore response A, is sharply peaked in the vicinity of 5.5 MHz (the actual peaking frequency is not critical) instead of at the 3.58 MHz frequency of the reference signal, and highly attenuates signals below 500 KHz and harmonics of the reference signal frequency (i.e., approximately 7.2 MHz and above). As can be seen from composite response A, amplitude changes in the vicinity of the 3.58 MHz reference signal frequency are small with frequency variations in this region. Since the composite response is relatively flat instead of peaked at 3.58 MHz, phase changes in the vicinity of 3.58 MHz also are small with frequency variations in this region.

The response of composite filter 275 resembles that of a double tuned filter and, compared to the arrangement of FIG. 1, exhibits significantly greater phase response stability, particularly with regard to normally expected small frequency deviations in the vicinity of the 3.58 MHz subcarrier frequency and variations in component values due to tolerances from receiver to receiver. More specifically, the phase versus frequency transfer characteristic of network 275 is less sensitive to frequency deviations about the 3.58 MHz reference signal frequency compared to the single-tuned bandpass filter circuit 48 of FIG. 1.

Network 275 does not require relatively large and costly adjustable elements, and can be fabricated from commonly available elements which may be encapsulated in whole or in part to ensure mechanical integrity (i.e., exposed fragile wires and connecting terminals, particularly with regard to the inductor elements, can be eliminated or significantly reduced in number). Time consuming adjustments from unit to unit are also advantageously avoided, thereby facilitating automated circuit assembly and testing. In addition, the arrangement of FIG. 2 requires only three external terminal connections to the integrated circuit instead of four as in the case of the FIG. 1 arrangement, thereby making an external terminal of the integrated circuit available for other purposes. This result is of obvious advantage particularly in a complex integrated circuit design, which commonly requires numerous connections to external discrete circuits by means of external terminals which are limited in number as a practical matter.

What is claimed is:

1. In a system for processing color television signals including chrominance signals having a phase representative of image hue and a reference subcarrier component having a nominal phase relative to said chrominance signals; said system including chrominance signal demodulator means with an input coupled to receive said chrominance signals and a reference signal input, wherein proper operation of said demodulator means requires that chrominance and reference signals are applied with appropriate timing synchronism to said demodulator inputs; apparatus comprising:

phase control means responsive to said chrominance signals and to a signal derived from said reference subcarrier component, for providing an output signal including a phase controlled reference signal having a phase modified toward the phase of said chrominance signal when the phase of said chrominance signal is within a range of phases corresponding to a nominal range of flesh tone phase; and composite filter means coupled between said output of said phase control means and said demodulator reference signal input for providing a filtered reference signal at said demodulator reference signal input in timing synchronism with said received chrominance signals appropriate for proper operation of said demodulator means, said composite filter means comprising:

first filter means tuned to exhibit a peak amplitude response at a first frequency different from the frequency of said reference signal, for imparting a first phase shift component to said reference signal; and second filter means coupled to said first filter means and exhibiting a peak amplitude response at a second frequency different from said first frequency and greater than the frequency of said reference signal, and imparting a second phase shift component to said reference signal, the sum of said first and second phase shift components being such that filtered reference signals applied to said demodulator reference signal input exhibit said timing synchronism; and wherein said composite filter means exhibits an amplitude versus frequency response in the region of the reference signal frequency such that amplitude and phase variations of said filtered reference signal in said region are small with expected changes in the frequency of said reference signal in said region.

2. Apparatus according to claim 1, wherein:

said composite filter means is a bandpass filter for significantly attenuating harmonics of said reference signal frequency and frequencies below the band of frequencies occupied by said chrominance signals.

3. Apparatus according to claim 2, wherein:

said first and second filter means are arranged as bandpass filters.

4. Apparatus according to claim 3, wherein:

said first filter means comprises the series combination of a first inductance and capacitance;

said second filter means comprises the parallel combination of a second inductance and capacitance;

said series and parallel combinations are arranged in series between said output of said phase control means and a point of reference potential; and said filtered reference signal from said composite filter means is derived from the junction of said series and parallel combinations.

5. Apparatus according to claim 2, wherein:

said sum of said first and second phase shift components imparts a phase advance to reference signals applied to said demodulator means relative to reference signals applied to said composite filter means from said phase control means.

6. In a system for processing color television signals including chrominance signals having a phase representative of image hue and a reference subcarrier component having a nominal phase relative to said chrominance signals; said system including first and second chrominance signal demodulators each having an input coupled to receive said chrominance signals and a reference signal input, wherein proper operation of said demodulators requires that chrominance and reference signals are applied with appropriate timing synchronism to said demodulator inputs, and that signals applied to said reference signal inputs exhibit a prescribed mutual phase difference; apparatus comprising:

phase control means responsive to said chrominance signals and to a reference signal derived from said reference subcarrier component for providing an output signal including a phase controlled reference signal having a phase modified toward the phase of said chrominance signal when the phase of said chrominance signal is within a range of phases corresponding to a nominal range of flesh tone phase; and composite filter means coupled between said output of said phase control means and said reference signal inputs for providing a first filtered reference signal at said reference signal input of said first demodulator and a second filtered reference signal at said reference input of said second demodulator in timing synchronism with said received chrominance signals appropriate for proper operation of said first and second demodulators, said composite filter means comprising:

first filter means tuned to exhibit a peak amplitude response at a first frequency different from the frequency of said reference signal, for imparting a first phase shift component to said first filtered reference signal;

second filter means coupled to said first filter means and exhibiting a peak amplitude response at a second frequency different from said first frequency and greater than the frequency of said reference signal, and imparting a second phase shift component to said first filtered reference signal, the sum of said first and second phase shift components being such that said first filtered reference signal exhibits said timing synchronism; and wherein said first filter means includes third filter means coupled between said reference input of said first demodulator and said reference input of said second demodulator, for imparting a third phase shift component corresponding to said mutual phase difference to said second filtered reference signal, the sum of said first, second and third phase shift components being such that said second filtered reference signal exhibits said timing synchronism;

said composite filter means exhibiting an amplitude versus frequency response in the region of the reference signal frequency such that amplitude and phase variations of said reference signal in said region are small with expected changes in the frequency of said reference signal in said region.

7. Apparatus according to claim 6, wherein:
said first and second filtered reference signals exhibit a mutually quadrature phase relationship.

8. Apparatus according to claim 6, wherein:
said phase control means and said first and second demodulators are fabricated in a single integrated circuit having a first external terminal coupled to said output of said phase control means, a second external terminal coupled to said reference signal input of said first demodulator, and a third external terminal coupled to said reference signal input of said second demodulator;

said composite filter means is a bandpass filter for attenuating harmonics of said reference signal frequency and is coupled between said first and second external terminals; and said third filter means is coupled between said second and third external terminals.

* * * * *